United States Patent
Sandoz et al.

(10) Patent No.: US 9,211,664 B2
(45) Date of Patent: Dec. 15, 2015

(54) MULTI-PIECE ACOUSTIC SPRAY FOAM CONTROL SYSTEM AND METHOD

(71) Applicant: Honda Motor Co., Ltd., Tokyo (JP)

(72) Inventors: Edouard S. Sandoz, Powell, OH (US); Shawn W. Campbell, Dublin, OH (US); Aron K. Madsen, Marysville, OH (US); Robert G. ZumMallen, East Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 100 days.

(21) Appl. No.: 14/079,270

(22) Filed: Nov. 13, 2013

(65) Prior Publication Data

US 2015/0130203 A1 May 14, 2015

(51) Int. Cl.
 *B60J 7/00* (2006.01)
 *B29C 44/38* (2006.01)
 *B62D 29/00* (2006.01)

(52) U.S. Cl.
 CPC ............ *B29C 44/385* (2013.01); *B62D 29/002* (2013.01); *Y10T 29/49826* (2015.01)

(58) Field of Classification Search
 CPC . B60J 7/0084; B29C 44/385; Y10T 29/49826
 USPC ............ 296/187.02, 203.02, 203.03, 203.04, 296/209, 1
 See application file for complete search history.

(56) References Cited

U.S. PATENT DOCUMENTS

| | | | | |
|---|---|---|---|---|
| 5,344,208 A | * | 9/1994 | Bien et al. ................ | 296/187.02 |
| 5,631,027 A | | 5/1997 | Takabatake | |
| 5,800,896 A | * | 9/1998 | Kobayashi ................. | 428/67 |
| 5,806,915 A | * | 9/1998 | Takabatake ............... | 296/187.02 |
| 5,806,919 A | | 9/1998 | Davies | |
| 6,079,180 A | | 6/2000 | Wycech | |
| 6,337,355 B1 | * | 1/2002 | Yamashita et al. ........... | 521/115 |
| 6,357,819 B1 | * | 3/2002 | Yoshino .................... | 296/187.02 |
| 6,358,584 B1 | * | 3/2002 | Czaplicki ................... | 428/36.5 |
| 6,880,657 B2 | | 4/2005 | Schneider et al. | |
| 6,932,421 B2 | | 8/2005 | Barz | |
| 8,066,322 B2 | | 11/2011 | Mori | |
| 8,079,442 B2 | | 12/2011 | Wojtowicki | |
| 8,123,285 B2 | * | 2/2012 | Lee et al. .................. | 296/193.06 |
| 8,444,214 B2 | * | 5/2013 | Helferty .................. | B60R 13/07 296/187.02 |
| 8,911,008 B1 | * | 12/2014 | Campbell .............. | B60J 7/0084 296/187.02 |
| 2002/0033618 A1 | * | 3/2002 | Kwon ....................... | 296/203.03 |
| 2002/0174954 A1 | * | 11/2002 | Busseuil et al. .............. | 156/349 |
| 2006/0043772 A1 | | 3/2006 | Richardson | |
| 2012/0146296 A1 | | 6/2012 | Deachin et al. | |
| 2012/0235442 A1 | * | 9/2012 | Ezzat .................... | B62D 29/002 296/187.02 |
| 2012/0318452 A1 | * | 12/2012 | Bradley .............. | B29C 44/1271 156/258 |

* cited by examiner

*Primary Examiner* — Pinel Romain
(74) *Attorney, Agent, or Firm* — Rankin, Hill & Clark LLP (57) ABSTRACT

An acoustic spray foam control system and method for a vehicle includes an acoustic spray foam control baffle, a wedge member and acoustic spray foam. The acoustic spray foam control baffle is mounted within a cavity defined in a vehicle body of the vehicle. The acoustic spray foam control baffle has a tapered recess portion defining a tapered recess. The wedge member is complementarily received in the tapered recess of the tapered recess portion of the acoustic spray foam control baffle for applying force against the tapered recess portion to set the acoustic spray foam control baffle within the cavity. The acoustic spray foam is injected into the cavity on one side of the acoustic spray foam control baffle and contained thereby.

20 Claims, 7 Drawing Sheets

MULTI-PIECE ACOUSTIC SPRAY FOAM CONTROL SYSTEM AND METHOD

BACKGROUND

Dampening materials are presently used by many vehicle manufacturers to address NVH (noise, vibration and harshness) concerns in vehicles. The dampening material can be foam installed inside a hollow cavity defined within the vehicle body. Sometimes such foam (e.g., spray foam) is injected into the hollow cavity within the vehicle body. When injecting the spray foam, many vehicle manufacturers do not attempt to contain the injected foam, but rather allow it to be free flowing. In other applications, baffles are installed within the cavity of the vehicle body and each baffle includes an expandable foam portion or element that is typically heat activated; (i.e., the foam is not injected). These types of baffles may be secured within the hollow cavity of the vehicle body via suitable fasteners and arranged to limit the expandable foam portion or element.

SUMMARY

According to one aspect, an acoustic spray foam control system for a vehicle includes an acoustic spray foam control baffle, a wedge member and acoustic spray foam. The acoustic spray foam control baffle is mounted within a cavity defined in a vehicle body of the vehicle. The acoustic spray foam control baffle has a tapered recess portion defining a tapered recess. The wedge member is complementarily received in the tapered recess of the tapered recess portion of the acoustic spray foam control baffle for applying force against the tapered recess portion to set the acoustic spray foam control baffle within the cavity. The acoustic spray foam is disposed in the cavity on one side of the acoustic spray foam control baffle and contained thereby.

According to another aspect, an acoustic spray foam control assembly for a vehicle includes an acoustic spray foam control baffle and a wedge member. The acoustic spray foam control baffle is mounted within a vehicle body cavity defined in the vehicle for containing an acoustic spray foam injected into the cavity on one side of the acoustic spray control baffle. The acoustic spray foam control baffle has tapered walls defining a tapered recess. The wedge member is complementarily received in the tapered recess defined by the tapered walls of the acoustic spray foam control baffle to urge the tapered walls outwardly into engagement with the vehicle body walls defining the vehicle body cavity.

According to a further aspect, an acoustic spray foam control method for a vehicle is provided. In accordance with this aspect, the method includes installing an acoustic spray foam control baffle within a cavity defined in a vehicle body of the vehicle. The acoustic spray foam control baffle has a tapered recess portion defining a tapered recess. The method also includes installing a wedge member complementarily within the tapered recess defined by the tapered recess portion of the acoustic spray foam control baffle for applying force against the tapered recess portion to set the acoustic spray foam control baffle within the cavity, and further includes injecting an acoustic spray foam into the cavity on one side of the acoustic spray foam control baffle.

DETAILED DESCRIPTION

Figure 1:
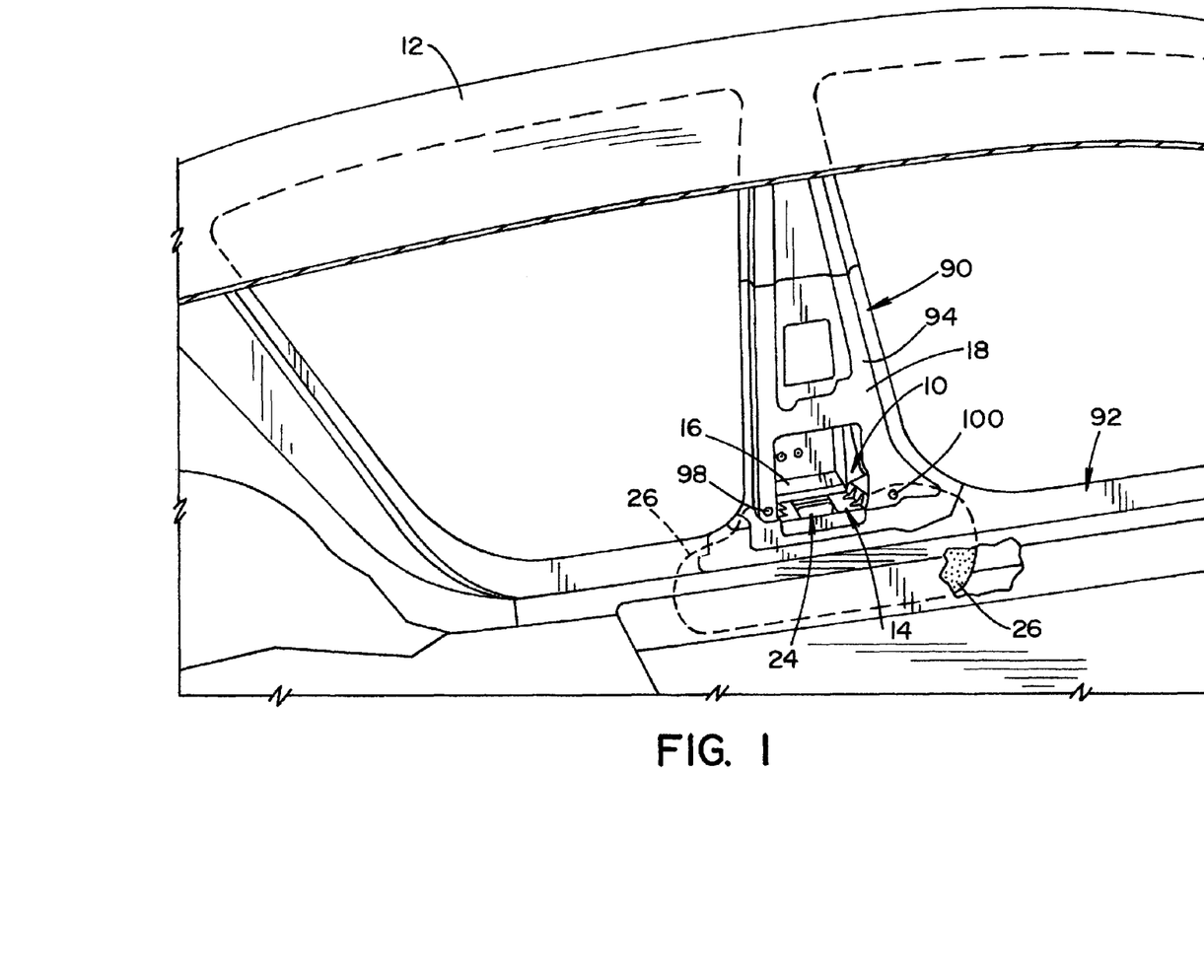
FIG. 1 is a perspective view of a multi-piece acoustic spray foam control assembly installed in a cavity defined in a vehicle body of a vehicle according to an exemplary embodiment.
Figure 2:
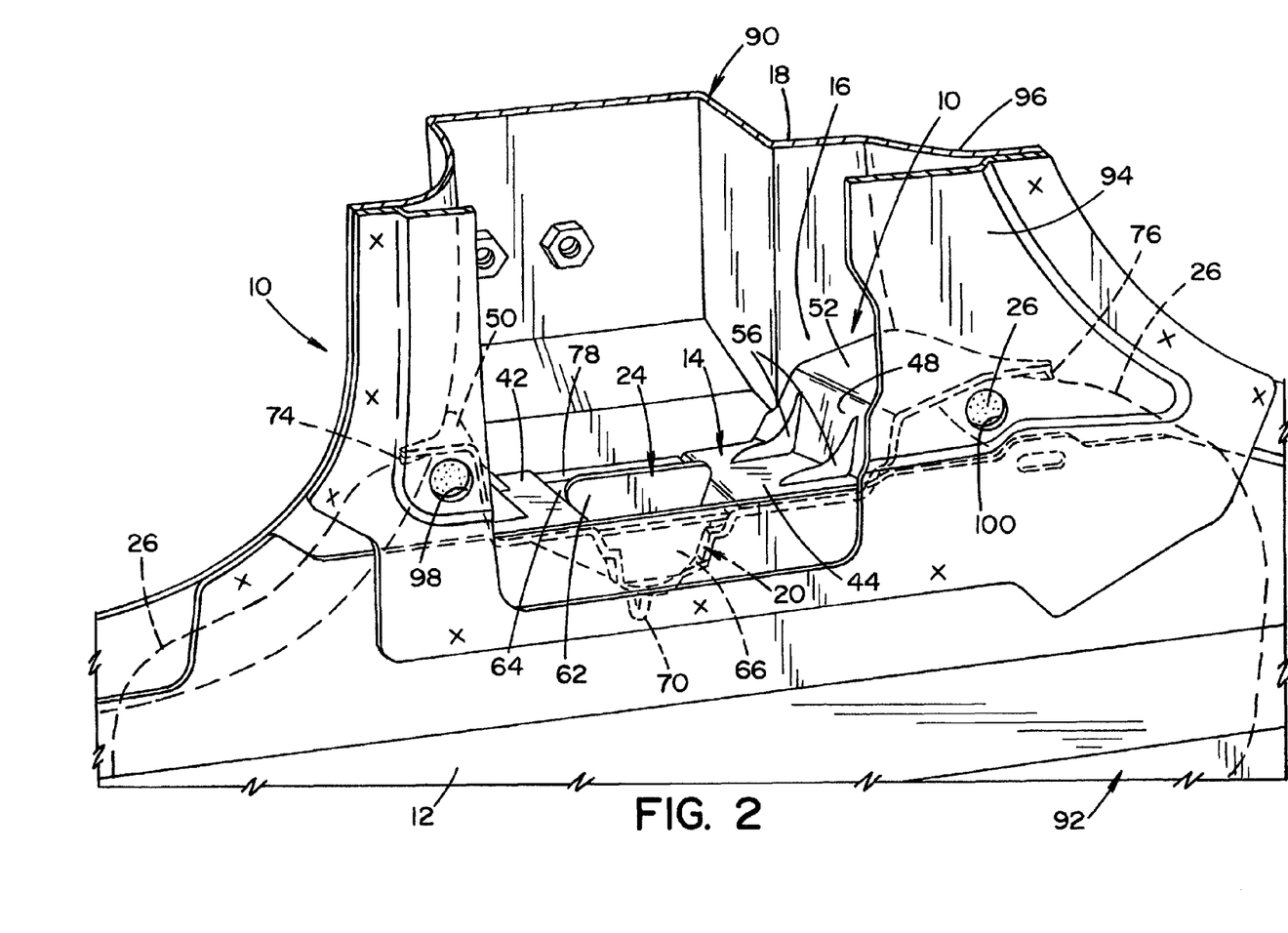
FIG. 2 is an enlarged perspective view showing the acoustic spray foam control baffle assembly mounted within the cavity.

Referring now to the drawings wherein the showings are for purposes of illustrating one or more exemplary embodiments and not for purposes of limiting the same, FIGS. 1 and 2 show an acoustic spray foam control system 10 for a vehicle 12. The acoustic spray foam control system 10 includes an acoustic spray foam control baffle 14 mounted within a cavity 16 defined in a vehicle body 18 of the vehicle 12. The acoustic spray foam control baffle 14 has a tapered recess portion 20 defining a tapered recess 22. The acoustic spray foam control system 10 additionally includes a wedge member 24 and acoustic spray foam 26. As will be described in more detail below, the wedge member 24 is complementarily received in the tapered recess 22 of the tapered recess portion 20 to set the acoustic spray foam control baffle 14 within the cavity 16. The acoustic spray foam 26 is injected into the cavity 16 on one side of the acoustic spray foam control baffle 14 (i.e., a lower side in the illustrated embodiment) and contained thereby (i.e., the acoustic spray foam control baffle 14 contains the acoustic spray foam 26 and inhibits flow of the acoustic spray foam 26 upward past the acoustic spray foam control baffle 14).

Figure 3:
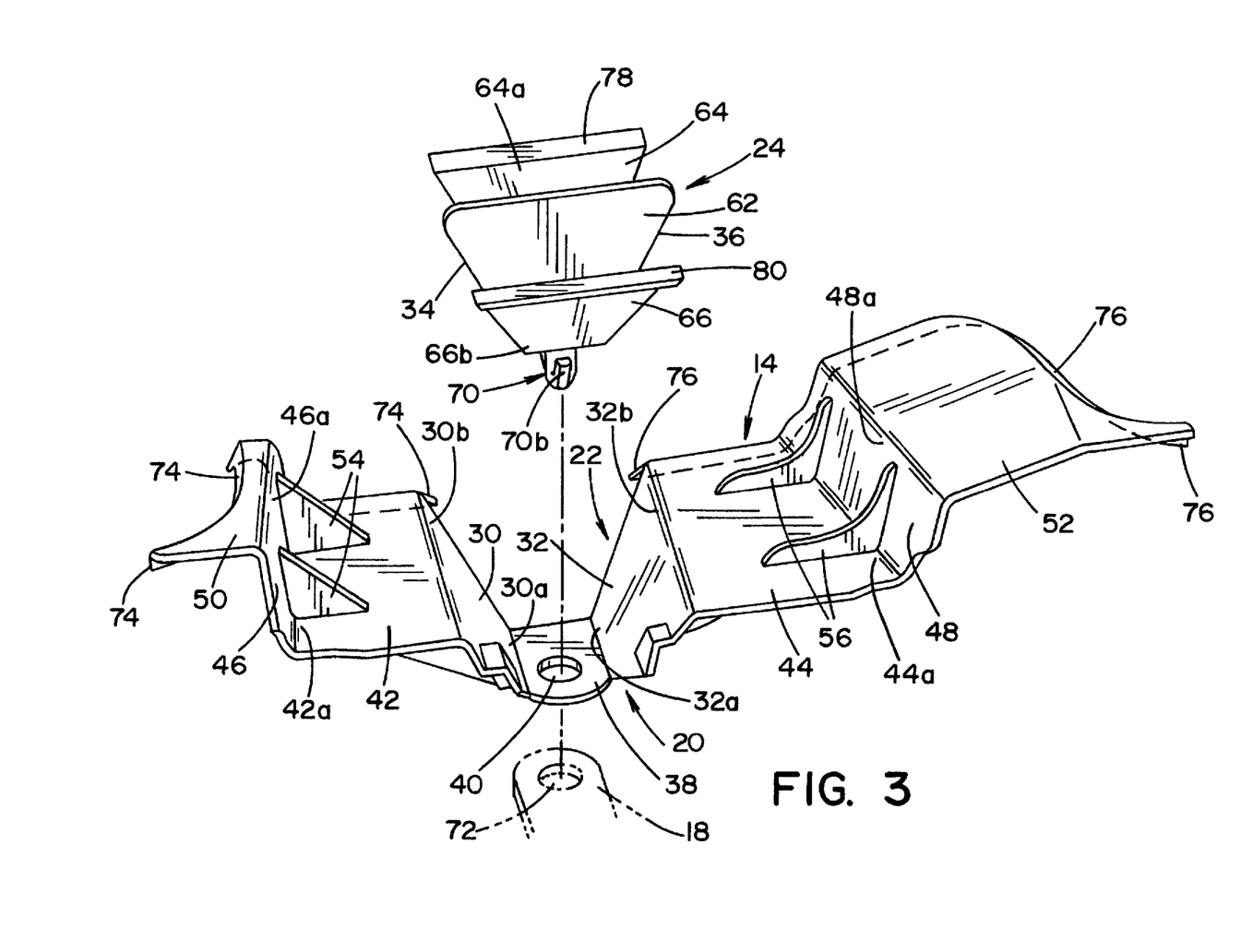
FIG. 3 is an exploded perspective view of the acoustic spray foam control baffle assembly showing a baffle and wedge member of the baffle assembly, and also showing a portion of the vehicle body to which the acoustic spray foam control baffle assembly is mounted.
Figure 4:
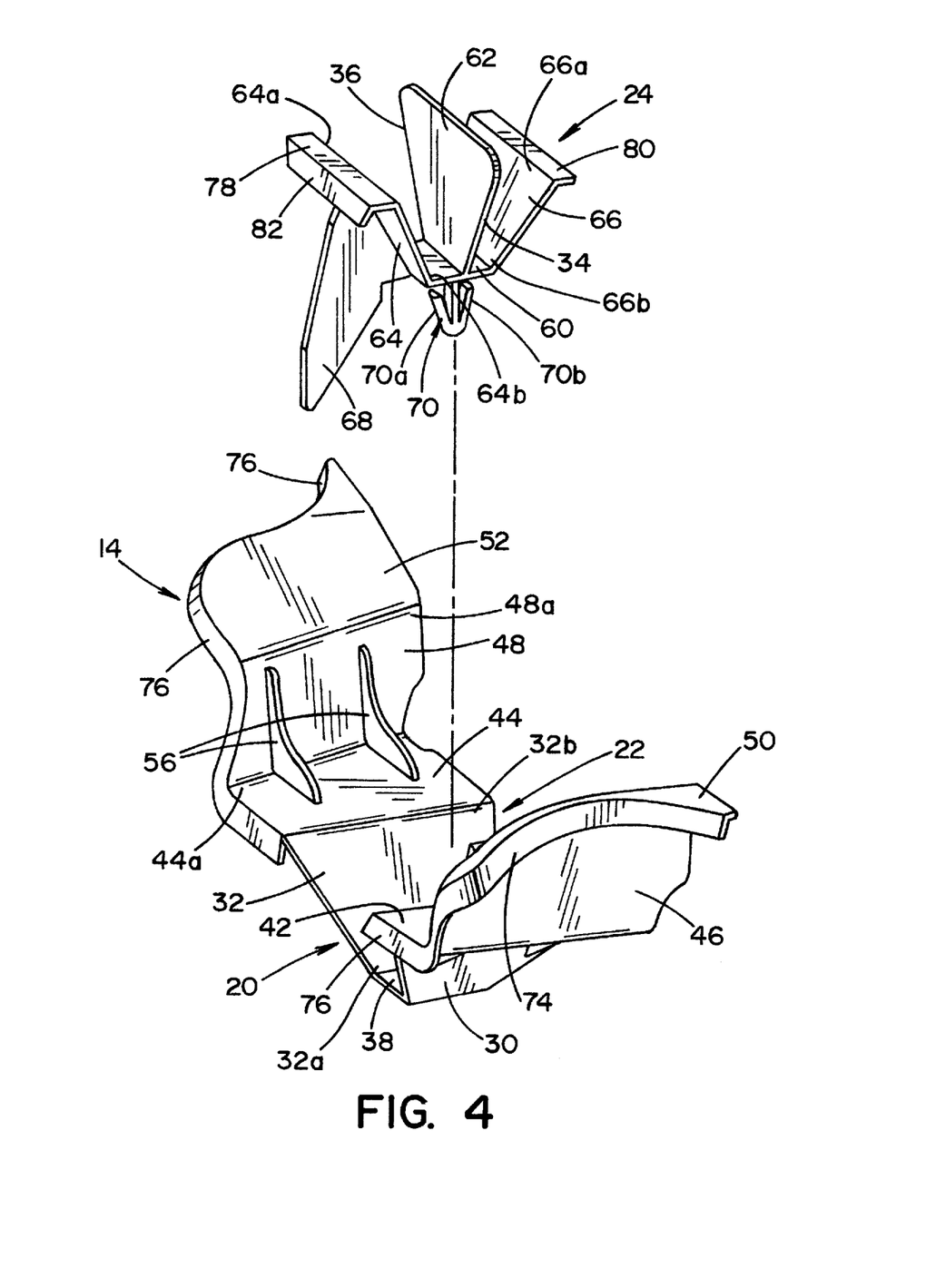
FIG. 4 is another exploded perspective view of the acoustic spray foam control baffle assembly that is rotated approximately 90 degrees relative to FIG. 3.
Figure 5:
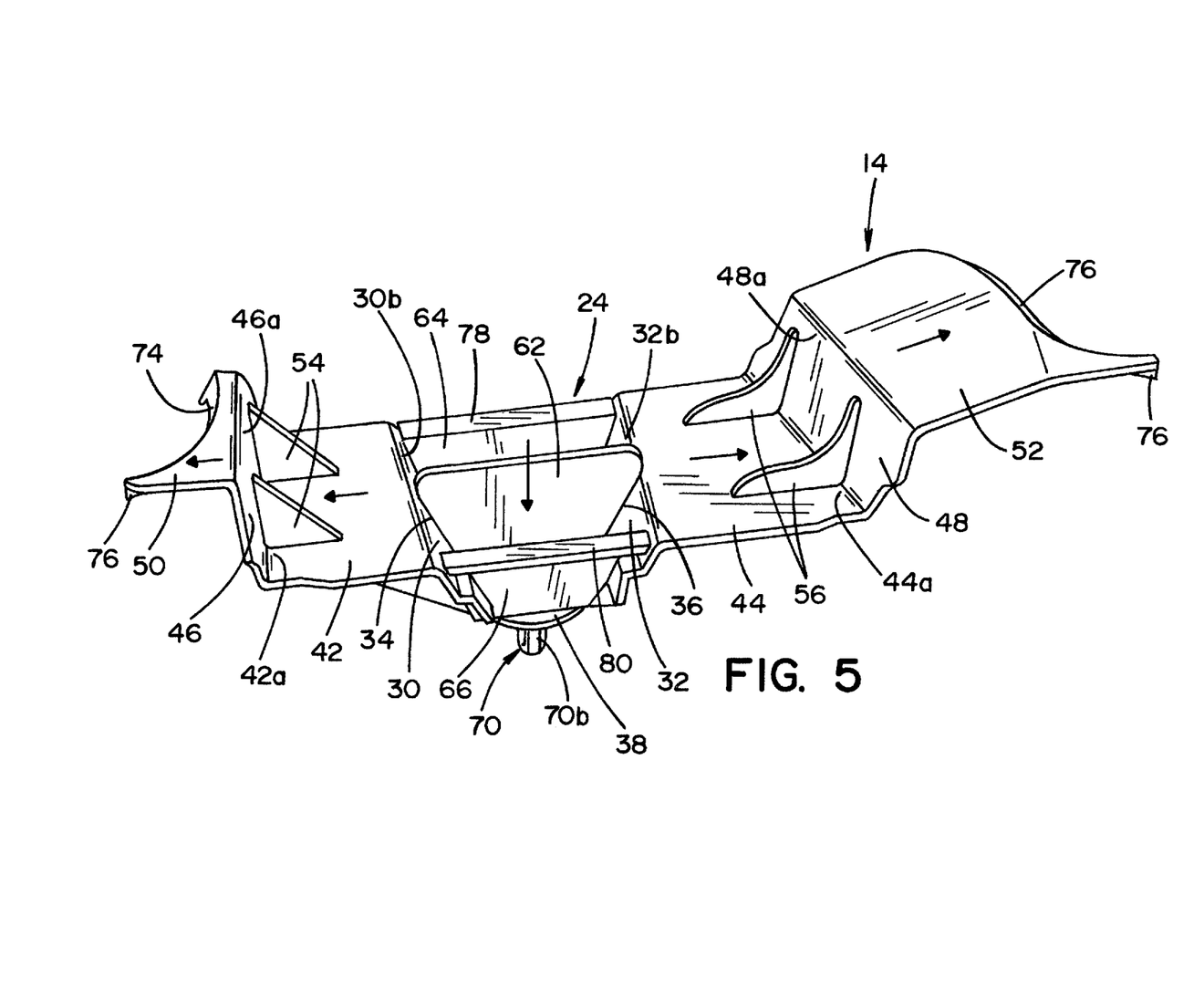
FIG. 5 is a perspective view of the acoustic spray foam control baffle assembly showing the wedge member being complementarily installed within the baffle and applying force thereagainst.

With additional reference to FIGS. 3-5, the acoustic spray foam control baffle 14 and the wedge member 24 together form an acoustic spray foam control assembly for the vehicle 12. In the illustrated embodiment, the tapered recess portion 20 of the acoustic spray foam control baffle 14 includes a pair of spaced apart tapered walls 30, 32 and the wedge member 24 includes corresponding tapered surfaces 34, 36 that, respectively, engage and apply force against the pair of spaced apart tapered walls 30, 32. That is, the corresponding tapered surface 34 engages and applies force against the tapered wall 30 and the corresponding tapered surface 36 engages and applies force against the tapered wall 32. As shown, the pair of spaced apart tapered walls 30, 32 of the illustrated embodiment converge toward one another at lower ends 30a, 32a thereof. Additionally, and as also shown for the illustrated embodiment, the tapered recess portion 20 of the illustrated embodiment further includes a base wall 38 extending between the pair of spaced apart tapered walls 30, 32, particularly between lower ends 30a, 32a thereof. The base wall 38 can define a mounting aperture 40 therethrough.

Figure 6:
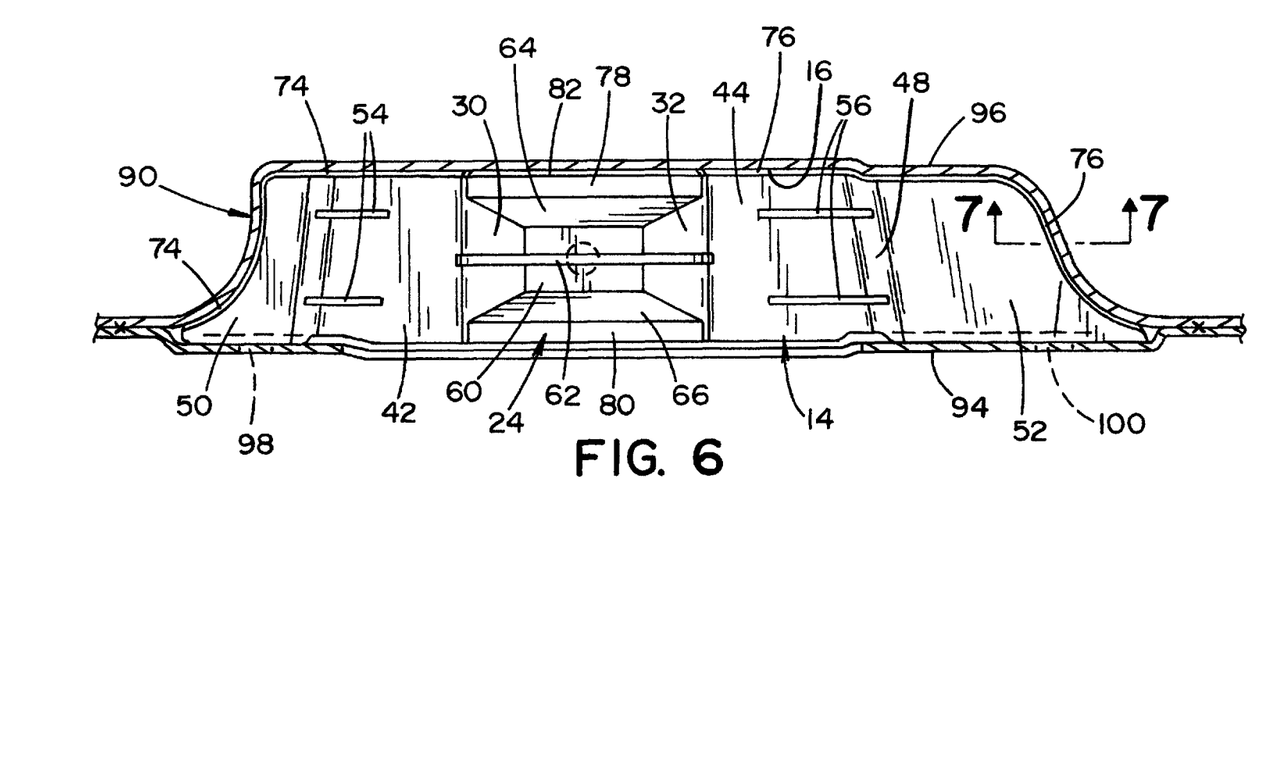
FIG. 6 is a top plan view of the acoustic spray foam control assembly mounted within the vehicle body (the vehicle body shown in cross section).

Additionally, the acoustic spray foam control baffle 14 can include wing walls extending outwardly from the tapered recess portion 20. More particularly, in the illustrated embodiment, the acoustic spray foam control baffle 14 includes lower wing walls 42, 44 extending outwardly from, respectively, distal ends 30b, 32b of the pair of spaced apart tapered walls 30, 32; spacing walls 46, 48 extending upwardly from, respectively, distal ends 42a, 44a of the lower wing walls 42, 44; and upper wing walls 50, 52 extending outwardly from, respectively, distal ends 46a, 48a of the spacing walls 46, 48. Spaced apart reinforcing walls 54 can further secure spacing wall 46 to lower wing wall 42 and, likewise, spaced apart reinforcing walls 56 can further secure lower wing wall 44 to spacing wall 48. As will be described in more detail below, the various walls 30, 32, 38, 42, 44, 46, 48, 50, 52 forming the acoustic spray foam control baffle 14 can be shaped and contoured to complementarily fit within the cavity 16 of the vehicle body 18 as best shown in FIG. 6.

The wedge member 24 of the illustrated embodiment includes a lower wall 60, an upstanding wall 62 extending from the lower wall 60, tapered walls 64, 66 also extending from the lower wall 60 and a supplemental wall 68 extending from one of the tapered walls 64, 66 (tapered wall 64 in the illustrated embodiment). More particularly, the lower wall 60 is configured and arranged to mate against the base wall 38 of the tapered recess portion 20 of the acoustic spray foam control baffle 14 as shown best in FIG. 5. The upstanding wall 62 particularly extends orthogonally from the lower wall 60. As shown, the upstanding wall 62 has a first side edge that forms one of the corresponding tapered surfaces (i.e., corresponding tapered surface 34) and a second side edge forming another of the corresponding tapered surfaces (i.e., corresponding tapered surface 36). The tapered walls 64, 66 particularly extend acutely (i.e., at acute angles and not orthogonally) from the base wall 60 on opposite sides of the upstanding wall 62. More particularly, the tapered walls 64, 66 have distal ends 64a, 66a spaced apart farther than proximal ends 64b, 66b thereof. The supplemental wall 68 particularly extends orthogonally from the tapered wall 64 on a side thereof that faces away from the upstanding wall 62.

The wedge member 24 can further include a mounting clip 70 that can be received through the mounting aperture 40 defined in the base wall 38 of the acoustic spray foam control baffle 14. More specifically, the mounting clip 70 can be received through the mounting aperture 40 to position the acoustic spray foam control baffle 14 and the wedge member 24 relative to one another. The mounting clip 70 of the illustrated embodiment includes wings 70a, 70b for locking the mounting clip 70 after receipt through the mounting aperture 40, though other types of mounting clips can be used. As shown in FIG. 3, the vehicle body 18 can define a vehicle aperture 72 into which the mounting clip 70 can be further received (i.e., after receipt through the mounting aperture 40) to position the wedge member 24 and the acoustic spray foam control baffle 14 relative to the vehicle body 18. In particular, the vehicle body aperture 72 can be provided in an arm portion of the vehicle body 18 as shown in FIG. 3, though this is not required.

The walls 42, 44, 46, 48, 50 and 52 can include a flange that is turned toward the acoustic spray foam 26 such that injection of the spray foam 26 into the cavity 16 urges the flange into sealing engagement with the vehicle body 18. More particularly, in the illustrated embodiment, the upper wing walls 50, 52, the spacing walls 46, 48 and the lower wing walls 42, 44 include an downturned flange (i.e., downturned flange 74 on walls 42, 46, 50 and downturned flange 76 on walls 44, 48, 52). The downturned flanges 74, 76 are particularly turned toward the acoustic spray foam 26 such that injection of the acoustic spray foam 26 urges the flanges 74, 76 into sealing engagement with the vehicle body 18. In addition, the tapered walls 64, 66 of the wedge member 24 can include winged flanges 78, 80. Additionally, downturned flange 82 can be disposed distally on winged flange 78 and can function similar to the downturned flanges 74, 76 on the acoustic spray foam control baffle 14.

The acoustic spray foam control baffle 14 is generally flexible prior to installation of the wedge member 24 into the tapered recess 22 to facilitate ease of installation of the acoustic spray foam control baffle 14 into the cavity 16 of the vehicle body 18 and is generally fixed (i.e., cannot be moved and/or is relatively inflexible) after installation of the wedge member 24 into the tapered recess 22. Thus, while in the flexible state, the acoustic spray foam control baffle 14 can be mounted within the vehicle body cavity 16 defined in the vehicle 12 for purposes of containing the acoustic spray foam 26 that is subsequently injected into the cavity 16 on one side of the acoustic spray control baffle (i.e., an underside in the installation illustrated in FIGS. 1-2). The wedge member 24 is then complementarily received in the tapered recess 22 defined by the tapered walls 30, 32 of the acoustic spray foam control baffle 14 to urge the tapered walls 30, 32 (and more generally, the tapered recess portion 20) longitudinally outwardly into engagement with the vehicle body walls defining the vehicle body cavity 16. This is illustrated schematically with the arrows in FIG. 5. Accordingly, as the wedge member 24 is installed in the acoustic spray foam control baffle 14, the cooperation between the tapered walls 30, 32 and the corresponding tapered surfaces 34, 36 provided on the upstanding wall 62 of the wedge member 24 urges the acoustic spray foam control baffle 14 longitudinally outwardly as illustrated by the arrows.

Simultaneously, the clip 70, which can also be referred to as a protruding clip, is received through the mounting aperture 40 defined in the acoustic spray foam control baffle 14 to provide relative positioning between the acoustic spray foam control baffle 14 and the wedge member 24, and then is further received in the aperture 72 defined in the vehicle body 18 to mount both the acoustic spray foam control baffle 14 and the wedge member 24 to the vehicle body 18. An additional feature is that receipt of the clip 70 through the apertures 40 and 72 provides lateral positioning of the acoustic spray foam control baffle 14 and the wedge member 24 relative to the vehicle body 18.

In the embodiment illustrated in FIG. 1, the acoustic spray foam control baffle 14 and the wedge member 24 are particularly received within the cavity 16 defined by the vehicle body 18 at a location where a center pillar 90 of the vehicle body 18 mates with a side sill member 92. As shown in FIGS. 1, 2 and 6, the center pillar 90 is formed by inner and outer members 94, 96. These members 94, 96 can be secured by any known method, such as by welding. Additionally, the center pillar 90, via the members 94, 96, can be further secured to the side sill 92 by any known method, such as by welding. As best shown in FIG. 6, the particular shape of the acoustic spray foam control baffle 14 can be configured to complementarily fit within the cavity 16 so that a perimeter of the acoustic spray foam control baffle 14 matches the shape of the cavity 16 defined by the inner and outer members 94, 96. Likewise, the wedge member 24 can be particularly configured so that it also matches the shape of the cavity 16 defined by the inner and outer members 94, 96.

Advantageously, the positioning of the acoustic spray foam control baffle 14 within the cavity 16 can allow the spray foam 26 to be injected into the cavity 16 below the acoustic spray foam control baffle 14 via the injection apertures 98, 100. The acoustic spray foam control baffle 14, via its mounting within the cavity 16 by the wedge member 24, can then contain the acoustic spray foam 26 and prevent the acoustic spray foam 26 from moving upward past the acoustic spray foam control baffle 14. In one embodiment, the portion of the cavity 16 defined in the vehicle 18 above the acoustic spray foam control baffle 14 is reserved for a seatbelt retractor (not shown). Also advantageously, the outward force shown in FIG. 5 provided by the engagement between the wedge member 24 and the acoustic spray foam control baffle 14 can facilitate sealing engagement between the acoustic spray foam control baffle 14 and the vehicle body 18 to further inhibit passage of the acoustic spray foam 26 beyond the acoustic spray foam control baffle 14 (i.e., upward in the illustrated embodiment).

Figure 7:
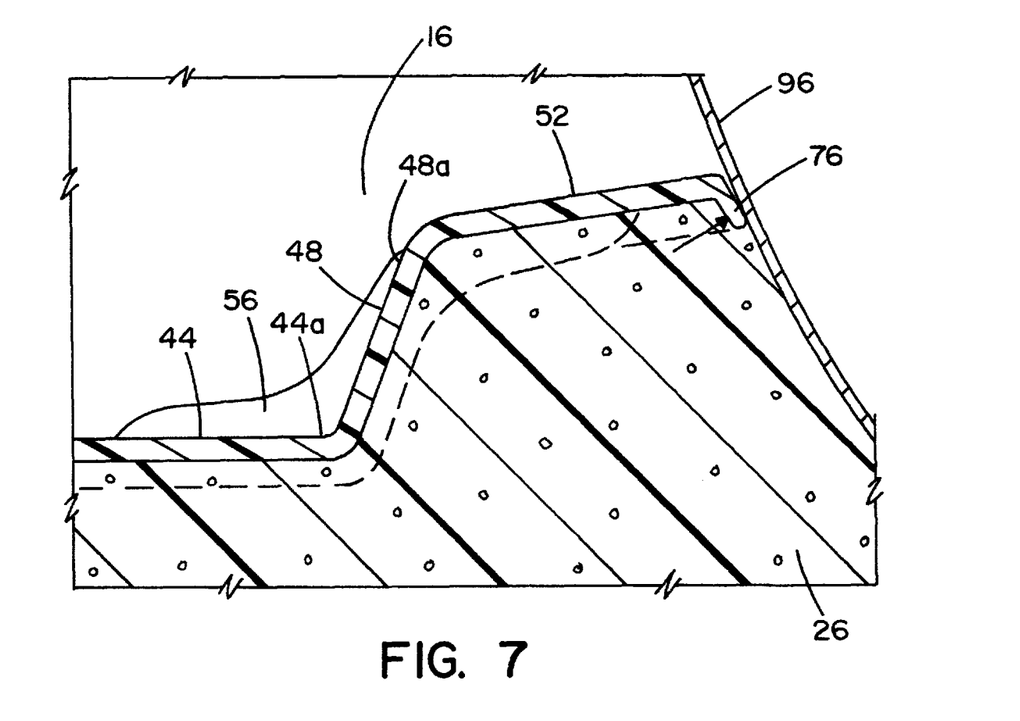
FIG. 7 is a partial cross-sectional view taken along the line 7-7 of FIG. 6.

Further, the downturned flanges 74, 76, 82 additionally inhibit the acoustic spray foam 26 from passing beyond the acoustic spray foam control baffle 14. This is particularly illustrated in FIG. 7 wherein the downturned flange 76 is illustrated in cross-section. As shown, any urging by the acoustic spray foam 26 during injection thereof (as illustrated schematically by the arrow in FIG. 7) causes the downturned flange 76 to further seal against the outer member 96 of the center pillar 90.

An acoustic spray foam control method for a vehicle will now be described. In particular, the method will be described in association with the acoustic spray foam control system 10 described hereinabove, though it is to be appreciated by those skilled in the art that the control method may be used with other control systems and/or control baffles. In the method, the acoustic spray foam control baffle 14 is first installed within the cavity 16 defined by the vehicle body 18 of the vehicle 12. This occurs while the acoustic spray foam control baffle 14 is in a flexible state.

As already described, the acoustic spray foam control baffle 14 has a tapered recess portion 22 defining the tapered recess 22. After installation of the acoustic spray foam control baffle 14, which can advantageously occur after assembly of the vehicle body 18 (though this is not required and could before body assembly), the wedge member 24 is complementarily installed within the tapered recess 22 defined by the tapered recess portion 20 of the acoustic spray foam control baffle 14 for applying force against the tapered recess portion 20 to set the acoustic spray foam control baffle 14 within the cavity 18. Installation of the wedge member 24 can further include insertion of the mounting clip 70 into the mounting aperture 40 of the acoustic spray foam control baffle 14 to position the acoustic spray foam control baffle 14 and the wedge member 24 relative to one another, and insertion of the mounting clip 70 into the vehicle body aperture 72 to position the acoustic spray foam control baffle 14 and the wedge member 24 relative to the vehicle body 12.

Once the acoustic spray foam control baffle 14 is set, the acoustic spray foam 26 can be injected into the cavity 16 on one side of the acoustic spray foam control baffle 14 (e.g., such as below the acoustic spray foam control baffle 14). Advantageously, the downturned flanges 74, 76 on the acoustic spray foam control baffle 14 and the flange 82 on the wedge member 24 can function to contain the acoustic spray foam 26 as already described hereinabove. Additionally, the mating engagement between the wedge member 24 and the acoustic spray foam control baffle 14, which urges the acoustic spray foam control baffle 14 as indicated by the arrows on the acoustic spray foam control baffle 14 in FIG. 5 (i.e., longitudinally outwardly, as indicated by the arrows pointing to the right and to the left in FIG. 5), further facilitates sealing of the acoustic spray foam control baffle 14 to the vehicle body 18, particularly portions thereof defining cavity 16.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An acoustic spray foam control system for a vehicle, comprising:
    an acoustic spray foam control baffle mounted within a cavity defined in a vehicle body of the vehicle, the acoustic spray foam control baffle having a tapered recess portion defining a tapered recess;
    a wedge member complementarily received in the tapered recess of the tapered recess portion of the acoustic spray foam control baffle to apply force against the tapered recess portion and urge the tapered recess portion outwardly to set the acoustic spray foam control baffle within the cavity; and
    an acoustic spray foam disposed in the cavity on one side of the acoustic spray foam control baffle and contained thereby.

2. The acoustic spray foam control system of claim 1 wherein the tapered recess portion includes a pair of spaced apart tapered walls and the wedge member includes corresponding tapered surfaces that, respectively, engage and apply force against the pair of spaced apart tapered walls.

3. The acoustic spray foam control system of claim 2 wherein the pair of spaced apart tapered walls converge toward one another at lower ends thereof.

4. The acoustic spray foam control system of claim 2 wherein the tapered recess portion further includes a base wall extending between the pair of spaced apart tapered walls.

5. The acoustic spray foam control system of claim 4 wherein the wedge member includes a lower wall that mates against the base wall of the tapered recess portion.

6. The acoustic spray foam control system of claim 5 wherein the wedge member further includes an upstanding wall extending from the lower wall, the upstanding wall having a first side edge forming one of the corresponding tapered surfaces and a second side edge forming another of the corresponding tapered surfaces.

7. The acoustic spray foam control system of claim 4 wherein the wedge member includes an upstanding wall having a first side edge forming one of the corresponding tapered surfaces and a second side edge forming another of the corresponding tapered surfaces.

8. The acoustic spray foam control system of claim 4 wherein the base wall defines a mounting aperture therethrough and the wedge member includes a mounting clip that is received through the mounting aperture to position the acoustic spray foam control baffle and the wedge member relative to one another.

9. The acoustic spray foam control system of claim 8 wherein the vehicle body defines a vehicle body aperture into which the mounting clip is received to position the wedge member and the acoustic spray foam control baffle relative to the vehicle body.

10. The acoustic spray foam control system of claim 4 wherein the acoustic spray foam control baffle includes:
    lower wing walls extending outwardly from, respectively, distal ends of the pair of spaced apart tapered walls;
    spacing walls extending upwardly from, respectively, distal ends of the lower wing walls; and
    upper wing walls extending outwardly from, respectively, distal ends of the spacing walls.

11. The acoustic spray foam control system of claim 10 wherein the upper wing walls, the spacing walls and the lower wing walls include an downturned flange that is turned toward the acoustic spray foam such that injection of the acoustic spray foam urges the end flange into sealing engagement with the vehicle body.

12. The acoustic spray foam control system of claim 1 wherein the wedge member includes:
   a lower wall;
   an upstanding wall extending orthogonally from the lower wall, the upstanding wall having a first side edge forming one of the corresponding tapered surfaces and a second side edge forming another of the corresponding tapered surfaces; and
   tapered walls extending acutely from the base wall on opposite sides of the upstanding wall, the tapered walls having distal ends spaced farther apart than proximal ends thereof.

13. The acoustic spray foam control system of claim 12 including a supplemental wall extending orthogonally from one of the tapered walls on a side thereof that faces away from the upstanding wall.

14. The acoustic spray foam control system of claim 1 wherein the acoustic spray foam control baffle includes wing walls extending outwardly from the tapered recess portion, the wing walls each including a flange that is turned toward the acoustic spray foam such that injection of the spray foam into the cavity urges the flange into sealing engagement with the vehicle body.

15. The acoustic spray foam control system of claim 1 wherein the acoustic spray foam control baffle is flexible prior to installation of the wedge member into the tapered recess to facilitate ease of installation of the acoustic spray foam control baffle into the cavity and is fixed after installation of the wedge member into the tapered recess.

16. An acoustic spray foam control assembly for a vehicle, comprising:
   an acoustic spray foam control baffle mounted within a vehicle body cavity defined in the vehicle for containing an acoustic spray foam injected into the cavity on one side of the acoustic spray control baffle, the acoustic spray foam control baffle having tapered walls defining a tapered recess; and
   a wedge member complementarily received in the tapered recess defined by the tapered walls of the acoustic spray foam control baffle to urge the tapered walls outwardly into engagement with vehicle body walls defining the vehicle body cavity.

17. The acoustic spray foam control baffle of claim 16 wherein the acoustic spray foam control baffle includes a mounting aperture and the wedge member includes a protruding clip that is received through the aperture to position the acoustic spray control baffle relative to the wedge member.

18. The acoustic spray foam control baffle of claim 16 wherein the acoustic spray foam control baffle includes wing walls extending from the tapered walls, and further wherein the wing walls include downturned edges for sealing engagement with the vehicle body walls.

19. A method for control of acoustic spray foam in a vehicle, comprising:
   installing an acoustic spray foam control baffle within a cavity defined in a vehicle body of the vehicle, the acoustic spray foam control baffle having a tapered recess portion defining a tapered recess;
   installing a wedge member complementarily within the tapered recess defined by the tapered recess portion of the acoustic spray foam control baffle to urge walls of the tapered recess portion outwardly into engagement with the vehicle body defining the cavity to set the acoustic spray foam control baffle within the cavity; and
   injecting an acoustic spray foam into the cavity on one side of the acoustic spray foam control baffle.

20. The method of claim 19 further including:
   containing the acoustic spray foam with downturned edges on wing walls of the acoustic spray foam control baffle.

\* \* \* \* \*